(12) United States Patent
Karamanev et al.

(10) Patent No.: US 8,455,144 B2
(45) Date of Patent: Jun. 4, 2013

(54) BIO-FUEL CELL SYSTEM

(75) Inventors: Dimitre Gueorguiev Karamanev, London (CA); Victor R. Pupkevich, London (CA); Hossein Hojjati, Sarnia (CA)

(73) Assignee: The University of Western Ontario, London, ON (CA)

( * ) Notice: Subject to any disclaimer, the term of this patent is extended or adjusted under 35 U.S.C. 154(b) by 924 days.

(21) Appl. No.: 12/461,340

(22) Filed: Aug. 7, 2009

(65) Prior Publication Data
US 2010/0040909 A1 Feb. 18, 2010

Related U.S. Application Data

(66) Continuation-in-part of application No. 10/562,198, filed as application No. PCT/CA2004/000943 on Jun. 25, 2004, now Pat. No. 7,572,546, Substitute for application No. 60/482,765, filed on Jun. 27, 2003.

(51) Int. Cl.
*H01M 8/00* (2006.01)

(52) U.S. Cl.
USPC ........................................................ 429/400

(58) Field of Classification Search
None
See application file for complete search history.

(56) References Cited

U.S. PATENT DOCUMENTS

| | | | |
|---|---|---|---|
| 3,331,705 | A | 7/1967 | Davis et al. |
| 5,763,259 | A | 6/1998 | Panos |
| 6,214,088 | B1 | 4/2001 | Karamanev |
| 6,270,649 | B1 | 8/2001 | Zeikus et al. |
| 6,495,023 | B1 | 12/2002 | Zeikus et al. |
| 6,589,772 | B1 | 7/2003 | Banfield et al. |
| 6,696,184 | B1 | 2/2004 | Christian et al. |
| 2003/0049511 | A1 | 3/2003 | Ritts et al. |
| 2008/0044721 | A1 | 2/2008 | Heller et al. |

FOREIGN PATENT DOCUMENTS

| | | |
|---|---|---|
| JP | 62-256382 | 11/1987 |
| JP | 62256382 | 11/1987 |
| JP | 2006012773 | 1/2006 |
| KR | 3052789 | 6/2003 |
| WO | 01/04061 | 1/2001 |
| WO | 2005/001981 | 1/2005 |

OTHER PUBLICATIONS

Baker et al., "Microbial communities in acid mine drainage", FEMS Microbiology Ecology, 2003, vol. 44, Issue 2, pp. 139-152.
Uno et al., "Micromachining of Metals Using Microorganism", Materia Japan (Japan), vol. 37, No. 1, pp. 52-54, 1998.
Liu et al., "Electricity Generation Using an Air-Cathode Single Chamber Microbial Fuel Cell in the Presence and Absence of a Proton Exchange Membrane", Environmental Science & Technology, 2004, vol. 38, Issue 14, pp. 4040-4046.
Rhoads et al., "Microbial Fuel Cell using Anaerobic Respiration as an Anodic Reaction and Biomineralized Manganese as a Cathodic Reactant", Environmental Science & Technology, 2005, vol. 39, Issue 12, pp. 4666-4671.
International Search Report (Form PCT/ISA/210) for PCT/CA2004/000943, Dec. 29, 2005, 6 pages.
International Preliminary Report on Patentability (PCT/IB/373) for PCT/CA2004/000943, Mar. 23, 2006, 1 page.
Notification Concerning Transmittal of International Preliminary Report on Patentability (Form PCT/IB/326), Mar. 23, 2006, 1 page.
International Search Report (Form PCT/ISA/220) for PCT/CA2010/001210, Aug. 10, 2010.
Hybrid PEM Fuel Cell: Relax Cathode Approach, by Moraw, F. The University of British Columbia, Mar. 2009.
Evaluation of the Fe(III)/Fe(II) Redox Fuel Cell Cathode Couple in a Bioelectrolytic Solution, by Moraw, et al. Advanced Materials Research, vol. 15-17. pp. 315-320 (2007)(15).

*Primary Examiner* — Jon P Weber
*Assistant Examiner* — Thane Underdahl
(74) *Attorney, Agent, or Firm* — Lynn C. Schumacher; Hill & Schumacher

(57) ABSTRACT

The present invention discloses a new type of bio-fuel cell, based on the microbial regeneration of the oxidant, ferric ions. The bio-fuel cell is based on the cathodic reduction of ferric to ferrous ions, coupled with the microbial regeneration of ferric ions by the oxidation of ferrous ions, at a pH less than about 1.0, with fuel (such as hydrogen) oxidation on the anode electrode. The microbial regeneration of ferric ions is achieved by microorganisms such as *Leptospirillum ferriphilum*. Electrical generation is coupled with the consumption of carbon dioxide from atmosphere and its transformation into microbial cells, which can be used as a single-cell protein.

67 Claims, 6 Drawing Sheets

BIO-FUEL CELL SYSTEM

CROSS REFERENCE TO RELATED U.S. PATENT APPLICATION

This application is a continuation-in-part of U.S. patent application Ser. No. 10/562,198 filed May 16, 2006, now allowed and issued as U.S. Pat. No. 7,572,546 on Aug. 11, 2009, which application is a National Phase Application claiming the benefit of PCT/CA/2004/000943 filed on Jun. 25, 2004, which further claims the benefit of priority from U.S. patent application Ser. No. 60/482,765 filed on Jun. 27, 2003, entitled BIOFUEL CELL, which application was filed in English, all of which are incorporated herein by reference in their entirety.

FIELD OF THE INVENTION

The present invention relates to a bio-fuel cell, and more particularly the present invention relates to a bio-fuel cell system based on the microbial regeneration of the oxidant, ferric ions, by the process of aerobic oxidation of ferrous to ferric ions by chemolithoautotrophic and/or mixotrophic microorganisms such as those of the *Leptospirillum* genus, *Ferroplasma* genus, *Sulfobacillus* genus, *Acidithiobacillus* genus, *Alicyclobacilus*, and any combination thereof, that can consume carbon dioxide from the atmosphere during electricity generation.

BACKGROUND OF THE INVENTION

A major component of the development of a hydrogen economy is the wide scale adoption of fuel cell technology. While there have been significant advances towards the application of fuel cells in everyday life, their widespread use has not been achieved yet due in part to the high cost of electricity they produce, see Rose, R., Fuel Cells and Hydrogen: The Path Forward, *Report Prepared for the Senate of the USA*, <http://www.fuelcellpath.org>.

The slow kinetics of the oxygen reduction reaction on the cathode of the most popular proton-exchange membrane (PEM) hydrogen-oxygen fuel cell is the main reason for both the high cost of the fuel cell itself (requirement of Pt as catalyst) and of low electrical fuel efficiency, around 50% as disclosed in Bockris, J. O.-M. and R. Abdu, *J. Electroanal. Chem.*, 448, 189 (1997).

The use of redox fuel cells, in which oxygen is replaced by other oxidants, such as ferric ions, can result in the increase of the rate of cathodic reaction (or exchange current density in electrochemical terms) by several orders of magnitude, as disclosed in Bergens, S. H., G. B. Gorman, G. T. R. Palmore and G. M. Whitesides, *Science*, 265, 1418 (1994); Larsson, R. and B. Folkesson, *J. Appl. Electrochem.*, 20, 907 (1990); and Kummer, J. T. and D.-G. Oei, *J. Appl. Electrochem.*, 15, 619 (1985).

In addition, the rate of mass transfer of oxidant to the electrode surface (corresponding to limiting current density in electrochemical terms) is also higher, mainly because of the higher aqueous solubility of the oxidant in redox fuel cells (for example, 50 g/L for $Fe^{3+}$) as compared to that of oxygen (between 0.006 and 0.04 g/L, depending on the partial pressure and temperature). All these characteristics of the redox fuel cells should theoretically allow efficiencies for the transformation of chemical to electrical energy of 80 to 90% to be achieved using non-noble metal electrodes based on thermodynamic arguments. However, the main problem in redox fuel cells is the efficiency of reoxidation of the reduced form of the oxidant (oxidant regeneration), see Larsson, R. and B. Folkesson, *J. Appl. Electrochem.*, 20, 907 (1990); and Kummer, J. T. and D.-G. Oei, *J. Appl. Electrochem.*, 15, 619 (1985).

For example, γ-ray irradiation has been used for the reoxidation of $Fe^{2+}$ to $Fe^{3+}$ in a $H_2$—$Fe^{3+}/Fe^{2+}$ redox fuel cell as disclosed in Yearger, J. F, R. J. Bennett and D. R. Allenson, *Proc. Ann. Power Sources Conf.*, 16, 39 (1962). While the efficiency of the fuel cell itself was very high, the reported efficiency of the oxidant regeneration was well below 15%. In other cases, regeneration of the oxidant is carried out using oxygen over expensive catalyst [see Bergens, S. H., G. B. Gorman, G. T. R. Palmore and G. M. Whitesides, *Science*, 265, 1418 (1994)] which eliminates the advantage of the use of non-platinum cathode, and is still slow.

Therefore, in order to develop a practically viable redox fuel cell with high overall efficiency, it is necessary to develop an efficient method for oxidant regeneration as suggested in Larsson, R. and B. Folkesson, *J. Appl. Electrochem.*, 20, 907 (1990).

The process of aerobic oxidation of ferrous to ferric ions by chemolithoautotrophic microorganisms such as *Acidithiobacillus ferroxidans* (*A. ferrooxidans*) was discovered more than half a century ago, see A. R. Colmer, M. E. Hinkle, *Science*, 106 (1947) 253-256. These microorganisms have been widely used in metallurgy for the leaching of noble (Au), heavy (U) and base (Cu, Ni, Zn, Co) metals, as well as in environmental protection. The microbial iron oxidation is based on the following net reaction:

$$4Fe^{2+}+4H^{+}+O_2=4Fe^{3+}+2H_2O \qquad (1)$$

It has been shown that the rate of microbial oxidation of ferrous ions is 500,000 times faster than that obtained by purely chemical reaction with oxygen at pH between 1 and 2, see D. T. Lacey, F. Lawson, Biotechnology and Bioengineering, 12 (1970) 29-50.

When growing on ferrous iron oxidation, *A. ferrooxidans* uses one of the narrowest thermodynamic limits known in microbial world, see W. J. Ingledew, Biochimica et Biophysica Acta, 683 (1982) 89-117. The electron transport chain of iron oxidation by this microorganism contains two half-reactions:

$$4Fe^{2+}=4Fe^{3+}+4e^{-} \qquad (2)$$

which takes place outside of the cell membrane, and $$4e^{-}+O_2+4H^{+}=2H_2O \qquad (3)$$

inside of the membrane, see M. Nemati, S. T. L. Harrison, G. S. Hansford, C. Webb, Biochemical Engineering Journal, 1 (1998) 171-190. The electrons are transported through the cell wall via a chain of three electron carriers: rusticyanin, cytochrome c and cytochrome a.

The iron-oxidizing bacterium *A. ferrooxidans* is an autotrophic microorganism, i.e. it uses carbon dioxide ($CO_2$), usually from atmosphere, as a sole source of carbon, while inorganic reactions such as ferrous iron oxidation (1-3) supply it with energy. The laboratory-, pilot-, and industrial-scale oxidation of iron by *A. ferrooxidans* has been studied in different types of bioreactors. Under the usual cultivation conditions in a bioreactor containing *A. ferrooxidans* grown on ferrous ions, the redox potential can reach a value of 1000 mV, see M. Boon, K. C. A. M. Luyben, J. J. Heijnen, Hydrometallurgy, 48 (1998) 1-26. Since the potential of reaction (3) is 1120 mV vs. standard hydrogen electrode (SHE), up to approx. 90% of the reaction energy is used for the production of Fe3+, while the rest (~10%) is available to microorganisms for biomass formation and maintenance.

The biooxidation of ferrous iron by *A. ferrooxidans* has been used in electrochemical cells for several different purposes. In all these cases, the electrochemical reaction, taking place on the surface of the cathode is:

$$Fe^{3+}+e^-=Fe^{2+} \quad (4)$$

Several different counter-electrode (anode) reactions have been described:
A) Oxygen Formation According to the Reaction:

$$2H_2O=4e^-+O_2+4H^+ \quad (5a)$$

In that case, it is necessary to apply external electrical potential in order to reduce the ferric iron on one electrode and to produce oxygen on the other. This system has been used for the continuous regeneration of the microbial substrate (ferrous iron) which resulted in the production of very high cell yields, see N. Matsumoto, S. Nakasono, N. Ohmura, H. Saiki, Biotechnology and Bioengineering, 64 (1999) 716-721; and S. B. Yunker, J. M. Radovich, Biotechnology and Bioengineering, 28 (1986) 1867-1875.
B) Oxidation of Ferric Ions:

$$Fe^{2+}=Fe^{3+}+e^- \quad (5b)$$

This type of electrobioreactor has been used to determine the rate of microbial ferrous iron oxidation by measuring the value of the electrical current, see H. P. Bennetto, D. K. Ewart, A. M. Nobar, I. Sanderson, Charge Field Eff. Biosyst.—2, [Proc. Int. Symp.], (1989) 339-349; and K. Kobayashi, K. Ibi, T. Sawada, Bioelectrochemistry and Bioenergetics, 39 (1996) 83-88.
C) Oxidation of Organic Compounds such as Methanol:

$$CH_3OH+H_2O=CO_2+6H^++6e^- \quad (5c)$$

This system has been used for the electrochemical degradation of pollutants (methanol) in water, see A. Lopez-Lopez, E. Exposito, J. Anton, F. Rodriguez-Valera, A. Aldaz, Biotechnology and Bioengineering, 63 (1999) 79-86.

The above analysis of the energetics of ferrous iron oxidation by *A. ferrooxidans* shows that up to 90% of the Gibbs energy of microbial oxygen reduction can be used for the iron oxidation, i.e. production of electricity, while the rest will be consumed by the microorganisms for maintenance and formation of new cell biomass. It has also been found that the growth of *A. ferrooxidans* can be uncoupled from iron oxidation under certain conditions, see M. Nemati, S. T. L. Harrison, G. S. Hansford, C. Webb, Biochemical Engineering Journal, 1 (1998) 171-190, i.e. these microorganisms can oxidize ferrous iron under zero-growth conditions.

It has been recognized that the global warming, caused mainly by anthropogenic carbon dioxide emissions, is one of the main problems which humanity faces at the moment. Presently, the most promising way to reduce the release of carbon dioxide to atmosphere seems to be the transition from fossil fuel economy to hydrogen economy, see J. O. M. Bockris, International Journal of Hydrogen Energy, 27 (2002) 731-740.

Presently known oxygen/hydrogen fuel cells do not produce carbon dioxide when using hydrogen as fuel. However, it would be even more advantageous to provide a bio-fuel cell based on chemolithoautotrophic microorganisms which exhibit very high efficiency for production of electricity and which consumes $CO_2$ from atmosphere during its operation.

SUMMARY OF INVENTION

An object of the present invention is to provide a bio-fuel cell with an efficient method for the oxidant regeneration and which consumes $CO_2$.

In a preferred embodiment of the invention there is provided a bio-fuel cell based on the cathodic reduction of ferric to ferrous ions, coupled with the microbial regeneration of ferric ions by the oxidation of ferrous ions, with fuel (such as hydrogen) oxidation on the anode. The microbial regeneration of ferric ions is achieved by chemolithoautotrophic, mixotrophic, or mixotrophic and chemolithoautotrophic microorganisms.

In one aspect of the invention there is provided a system for production of electrical power, comprising;

a cathode compartment containing a cathode electrode;

an anode compartment containing an anode electrode and having at least one inlet for introduction of a fuel having a hydrogen constituent into said anode compartment, said anode compartment being separated from said cathode compartment by a membrane permeable to protons;

an external circuit making an electrical connection between the anode electrode and the cathode electrode;

a bioreactor including at least one inlet for introduction of oxygen ($O_2$) and a carbon source into the bioreactor, the bioreactor containing living microorganisms selected to be viable and active at a pH less than about 1.0 and being capable of oxidizing ferrous ($Fe^{2+}$) ions to ferric ions ($Fe^{3+}$), the bioreactor being in flow communication with the cathode compartment, the bioreactor and the cathode compartment containing an aqueous solution, the aqueous solution having a pH below about 1.0 and including the ferric ions ($Fe^{3+}$) and ferrous ions ($Fe^{2+}$), a pump for circulating the aqueous solution between the cathode compartment and the bioreactor, wherein in operation:

i) the aqueous solution is circulated between the cathode compartment and the bioreactor and the fuel is introduced into said anode compartment and a reaction at the anode electrode is electrochemical oxidation of the hydrogen constituent of the fuel to produce electrons ($e^-$) and protons ($H^+$), wherein said protons ($H^+$) cross the proton exchange membrane into the cathode compartment and said electrons ($e^-$) travel to the external circuit, and simultaneously ii) oxygen ($O_2$) and the carbon source are introduced into the bioreactor and the aqueous solution so that in the bioreactor the ferrous ions ($Fe^{2+}$) are aerobically oxidized by the microorganisms to ferric ions ($Fe^{3+}$) at a pH below about 1.0, and in the cathode compartment the ferric ions ($Fe^{3+}$) are reduced to the ferrous ions ($Fe^{2+}$) by electrons flowing from said external circuit to the cathode electrode;

wherein electric power is obtained by electrons passing through a load in the external circuit.

The present invention also provides a method for production of electrical power, comprising:

a) introducing a fuel having a hydrogen constituent into an anode compartment containing an anode electrode with a reaction at the anode electrode being electrochemical oxidation of said hydrogen constituent to produce electrons ($e^-$) and protons ($H^+$), wherein said protons ($H^+$) cross a proton conducting membrane into a cathode compartment containing a cathode electrode and said electrons travel ($e^-$) to an external circuit and electrons from the external circuit flow to the cathode electrode in the cathode compartment, the external circuit being connected to the cathode electrode and the anode electrode;

b) introducing oxygen ($O_2$) and a carbon source into a bioreactor, the bioreactor containing a plurality of microorganisms viable and active at a pH below about 1.0, the plurality of microorganisms being selected to be able to oxidize ferrous ions ($Fe^{2+}$) to ferric ions ($Fe^{3+}$); and c) circulating an aqueous solution including ferrous ions ($Fe^{2+}$) and ferric ions ($Fe^{3+}$) at a pH below about 1.0 from the cathode compartment to the bioreactor, and from the bioreactor to the cathode compartment, with a reaction at the cathode electrode being reduction of ferric ions ($Fe^{3+}$) to ferrous ions ($Fe^{2+}$) by the electrons ($e^-$) flowing to the cathode electrode from the external circuit, and simultaneously the plurality of microorganisms aerobically oxidizing ferrous ions ($Fe^{2+}$) to ferric ions ($Fe^{3+}$) in the bioreactor at a pH below about 1.0;

wherein electrical power is obtained by electrons passing through an electrical load in the external circuit.

The genus of each of the microorganisms may be any one of *Leptospirillum, Ferroplasma*, and *Sulfobacillus*. The genus of each of said microorganisms may additionally be any one of: *Acidithiobacillus, Alicyclobacilus, Acidimicrobium*, and *Ferrimicrobium*. The genus of all microorganisms used need not be the same.

The membrane permeable to protons may be a proton exchange membrane.

Controlling a ratio of electrical production to biomass production can be achieved by varying microbial cultivation parameters including an electrical potential of the cathode electrode, by varying the concentration of nutrient salts, or by varying the ratio of $Fe^{2+}/Fe^{3+}$ concentrations, or a combination of both.

BRIEF DESCRIPTION OF DRAWINGS

The following is a description, by way of example only, of the bio-fuel cell constructed in accordance with the present invention, reference being had to the accompanying drawings, in which.

DETAILED DESCRIPTION OF THE INVENTION

Figure 1A:
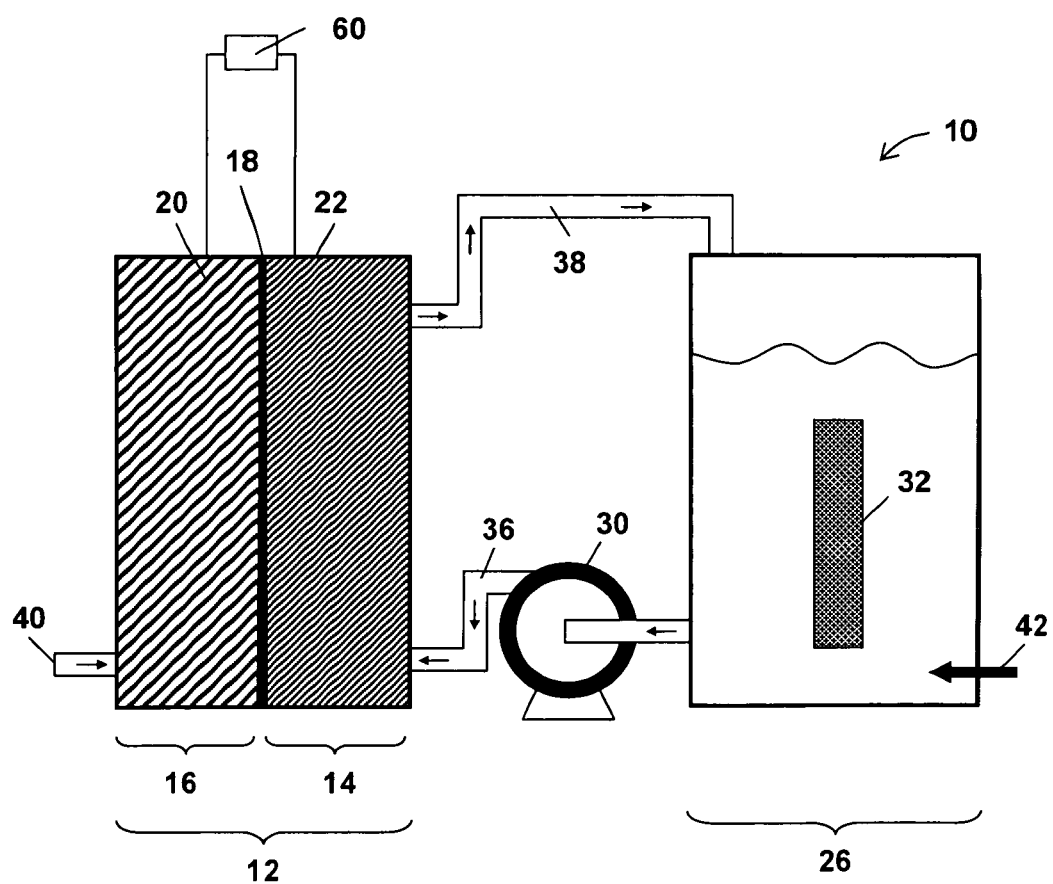
FIG. 1A shows a diagrammatic representation of a bio-fuel cell constructed in accordance with the present invention.

Generally speaking, the systems described herein are directed to a bio-fuel cell based on the microbial regeneration of the oxidant, ferric ions, by the process of aerobic oxidation of ferrous to ferric ions by chemolithoautotrophic and/or mixotrophic microorganisms. As required, embodiments of the present invention are disclosed herein. However, the disclosed embodiments are merely exemplary, and it should be understood that the invention may be embodied in many various and alternative forms.

The figures are not to scale and some features may be exaggerated or minimized to show details of particular elements while related elements may have been eliminated to prevent obscuring novel aspects. Therefore, specific structural and functional details disclosed herein are not to be interpreted as limiting but merely as a basis for the claims and as a representative basis for teaching one skilled in the art to variously employ the present invention. For purposes of teaching and not limitation, the illustrated embodiments are directed to a bio-fuel cell based on the microbial regeneration of the oxidant.

As used herein, the term "about", when used in conjunction with ranges of dimensions, temperatures, acidities, or other physical properties or characteristics is meant to cover slight variations that may exist in the upper and lower limits of the ranges of dimensions as to not exclude embodiments where on average most of the dimensions are satisfied but where statistically dimensions may exist outside this region.

As used herein, the term "chemolithoautotrophic microorganism" means a microorganism which uses inorganic substances as electron donors for their energy generation.

As used herein, the term "mixotrophic microorganism" means a microorganism which can use both inorganic and organic substances as substrates.

As used herein, the term "heterotrophic microorganism" means a microorganism which uses organic compounds as a carbon source and electron donor.

A preferred embodiment of a bio-fuel cell constructed in accordance with the present invention is based on the microbial oxidation of ferrous ions for the regeneration of the oxidant (ferric ions) where the ferric iron are regenerated by chemolithoautotrophic and/or mixotrophic microorganisms. These microorganisms may be selected from any one or combination of several genus groups. Specific examples include the *Leptospirillum* genus, the *Ferroplasma* genus, the *Sulfobacillus* genus, the *Acidithiobacillus* genus, the *Alicyclobacilus* genus, the *Acidimicrobium* genus, *Ferrimicrobium* genus, and combinations thereof, according to the reaction (1) above.

Any of the individual microorganisms in the *Leptospirillum* genus may be used, including, but not limited to, *Leptospirillum ferriphilum, Leptospirillum ferrooxidans, Leptospirillum ferrodiazotrophum* and *Leptospirillum thermoferrooxidans*.

Individual microorganisms that may be used from the *Ferroplasma* genus, including, but not limited to *Ferroplasma acodiphilum, Ferroplasma cupricumulans* and *Ferroplasma acidarmanus*.

Individual microorganisms that may be used from the *Sulfobacillus* genus, including, but not limited to *Sulfobacillus thermotolerans, Sulfobacillus thermosulfidooxidans, Sulfobacillus montserratensis, Sulfobacillus sibiricus*, in addition to several unclassified strains.

Individual microorganisms that may be used from the *Acidithiobacillus* genus include *Acidithiobacillus ferrooxidans*.

Individual microorganisms that may be used from the *Alicyclobacilus* genus include the species, *Alicyclobacillus tolerans* and *Alicyclobacillus disulfidooxidans* which can oxidize iron.

Individual microorganisms that may be used from the *Acidimicrobium* genus include the species *Acidimicrobium ferrooxidans*.

Individual microorganisms that may be used from the *Ferrimicrobium* genus include the species *Ferrimicrobium aidiphilum*.

The genus and species of all microorganisms used need not be the same. It would be understood by those skilled in the art that other microorganisms capable of oxidizing ferrous irons to ferric ions in environments as described below may be used in addition to those mentioned herein. The examples of microorganisms as listed herein are not to be interpreted as limiting but merely as a representative basis for teaching one skilled in the art to employ the present invention.

Referring to FIG. 1A, a bio-fuel cell-bioreactor system shown generally at 10 includes a fuel cell section 12 including a cathodic compartment 14 and an anodic compartment 16 separated from the cathodic compartment 14 by a proton conducting membrane 18, such as for example a Nafion proton-exchange membrane. The anode electrode 20 may be platinized carbon, while the cathode electrode 22 may be a layer of carbon felt or some other inert material having a porous or otherwise high surface area. The anode electrode 20 and the cathode electrode 22 are electrically connected to an external circuit 60 which is electrically powered by the system 10. The external circuit 60 includes an electrical load such that current flow through the load gives a voltage drop thus consuming electrical power.

While the membrane 18 is preferably a proton exchange membrane (PEM) other types of membranes may be used for separating physically the liquid in the cathode compartment 14 from the fuel (for example, hydrogen) in the anodic space. For example, the membrane does not necessarily need to be a proton-exchange membrane, but may also be an inert membrane (plastic or inorganic material) with very fine pores (less than 1000 micrometers in diameter, and preferably less than 100 micrometers), which just separates physically the anode and cathode compartments 16 and 14 respectively. Non-limiting examples include nitrocellulose membranes with a pore size below 0.2 micrometers; polytetrafluoroethylene (PTFE) membranes; hydrogels.

The membrane 18 may be a cation exchange, anion exchange, combination of both or perm-selective ion-exchange membrane. Typical inert membrane materials that may be used include, but are not limited to, TEFLON™ (PTFE), polyether sulfone, glass fiber, polycarbonate, with or without a mechanical support mesh. It will be appreciated by those skilled in the art that these are examples and it will be appreciated that many other inert membrane materials may be used.

As mentioned above, the membrane 18 is permeable to protons and may be made of a hydrogel, and the hydrogel may be, but is not limited to, polyvinyl alcohol, polyhydroxyethylmethacrylate, or polyethylene oxide. The hydrogels may be cross-linked, or not cross-linked. The hydrogel may be applied directly onto the anode electrode 20 in liquid (soluble) form and later solidified, or, the anode electrode 20 can be applied onto the hydrogel; or the hydrogel can form an individual membrane. The process of solidifying of the hydrogels can be achieved by heating, cooling, using of cross-linking agent or other methods known in the literature. A particular hydrogel that may be used is polyvinyl alcohol (PVA) produced by DuPont and is called Elvanol™. If the membrane 18 is made of hydrogel, it becomes permeable to protons in the presence of an aqueous acid solution. Mobile protons from the disassociated acid in the hydrogel make the hydrogel proton-conducting.

After applying the liquid or solution of the hydrogel onto the anode electrode 20, it in turn can be covered with an inert membrane (plastic or inorganic material) with very fine pores (less than a millimeter) described above such that the hydrogel acts as a glue between the electrode and the membrane. The hydrogel may be a pure hydrogel or can be cross-linked with other substances or may be mixed with other substances to form a composite.

Various layered structures may be configured for the proton conducting membrane. For example, the hydrogel membrane may be bonded on one surface thereof to a surface of the anode electrode and/or bonded on an opposing surface thereof to a surface of the cathode electrode. The hydrogel membrane may be a separate layer sandwiched between the anode electrode and the inert membrane or it may be sandwiched between the cathode layer and the inert layer. Thus, the membrane permeable to protons may have a layered structure, the structure comprising a first hydrogel membrane bonded to a membrane made of a substantially inert material having pores extending therethrough less than about 1000 micrometers in diameter.

The membrane permeable to protons may have another layered structure, each layer bonded to adjacent layers, the structure comprising, in order: (i) a first hydrogel membrane, and (ii) a membrane permeable to protons made of a substantially inert material having pores extending therethrough less than about 1000 micrometers, and preferably less than 100 micrometers in diameter; the first hydrogel membrane being bonded to the anode electrode or the cathode electrode.

The membrane permeable to protons may have another layered structure including: (i) a first hydrogel membrane, (ii) a membrane permeable to protons made of a substantially inert material having pores extending therethrough less than about 1000 micrometers in diameter bonded to the first hydrogel membrane, and (iii) a second hydrogel membrane bonded to the membrane permeable to protons made of a substantially inert material. The first hydrogel membrane may be bonded to the anode electrode, and the second hydrogel membrane may be bonded to the cathode electrode.

The membrane permeable to protons may have another layered structure including a first substantially inert material having pores extending therethrough less than about 1000 micrometers in diameter, a hydrogel membrane bonded on one surface thereof to a surface of the first substantially inert material, and a second substantially inert material having pores extending therethrough less than about 100 micrometers in diameter bonded on a surface thereof to an opposing surface of the hydrogel membrane to form a sandwich structure of the two substantially inert materials separated by the hydrogel membrane bonded therebetween.

The anode electrode 20 may have a porous structure and be made of a supporting carbon-based material containing platinum as a catalyst. Alternatively the anode catalyst may be a transition metal compound, for example tungsten carbide, iron phosphide, cobalt phosphide, either pure or mixed with carbon (for example, carbon black or activated carbon powder).

The cathode electrode 22 is made from a chemically inert electrically conducting material such as carbon, nickel, or stainless steel. It will be understood that the cathode electrode 22 may contain a catalyst which may be one of several catalysts, including minute amounts of gold, platinum, lead, palladium or other catalysts known to those skilled in the art. The cathode electrode 22 may include a layer of a porous or fibrous material which may be any one or combination of carbon, nickel, and stainless steel.

A bioreactor 26 is in flow communication with the cathode compartment 14. A suitable bioreactor 26 which may be used has been disclosed in D. G. Karamanev, C. Chavarie, R. Samson, Biotechnology and Bioengineering, 57 (1998) 471-476 which discloses a design combining an airlift system and a fibrous immobilized microbial cell support. In some embodiments, an inverse fluidized bed biofilm reactor may be used as disclosed in D. G. Karamanev, L. N. Nikolov, Environmental Progress, 15 (1996) 194-196. Most of the known types of aerobic free suspended or biofilm bioreactors can also be a suitable bioreactor, such as ones disclosed in L. Svirko, I. Bashtan and D. Karamanev, Int. Biohydrometallurgy Symp., Bariloche, Argentina, 2009.

The bioreactor 26 is used for the highly efficient oxidation of ferrous iron ions to ferric iron ions, i.e., for the oxidant regeneration. By definition, a bioreactor is a vessel in which microorganisms grow and perform biochemical reactions, such as in the present case ferrous iron oxidation. Air is injected into the bioreactor 26 using any well known technique such as being injected by a gas injection pump or nozzle, or may be sparged into the bioreactor 26 as a source of both oxygen and $CO_2$. Besides air, any fluid containing $O_2$ and $CO_2$ may be injected into bioreactor 26. While pumping atmospheric $CO_2$ is advantageous in respect of using the system 10 to consume atmospheric $CO_2$ it will be appreciated that this invention is not limited to consuming atmospheric $CO_2$ and other sources may be used.

As mentioned above, the bioreactor 26 is in flow communication with cathode compartment 14 and the system 10 includes means for circulating the aqueous solution from the bioreactor 26 to cathode compartment 14 via conduit 36, and from the cathode compartment 14 to the bioreactor 26 via conduit 38. The solution containing the microorganisms circulates between the bioreactor 26 and the cathode compartment 14 and does not enter into the anode compartment 16 due to the presence of the membrane 18 which is permeable only to protons. Only the fluid containing the hydrogen containing fuel is introduced into the anode compartment 16 which may be a pure gas (such as hydrogen) or a liquid if the fuel is methanol and/or ethanol.

When the redox couple is $Fe^{2+}/Fe^{3+}$, the aqueous solution containing ferrous ions ($Fe^{2+}$) and protons ($H^+$) are circulated from the cathode compartment 14 to the bioreactor 26 where the ferrous ions ($Fe^{2+}$) are oxidized by the chemolithoautotrophic and/or mixotrophic microorganisms 32 to ferric ions ($Fe^{3+}$) in an aerobic oxidation reaction given by $4Fe^{2+}+4H^++O_2=4Fe^{3+}+2H_2O$. The aqueous solution containing the ferric ions ($Fe^{3+}$) is then circulated from the bioreactor 26 back into the cathode compartment 14.

As mentioned above, electrical power is obtained by making electrical connection between a load in the external circuit 60 and the anode electrode 20 and cathode electrode 22. A non-limiting means for circulating the aqueous solutions through compartment 14 and bioreactor 26 is a pump 30 as shown in FIG. 1A. Many different types of pumps may be used including, but not limited to, centrifugal pumps, positive-displacement pumps and airlift systems. Thus as used herein "pump" refers any device, pump or pressure based for example, known to those skilled in the art that can be used to circulate the liquids in the bio-fuel cell.

Figure 1B:
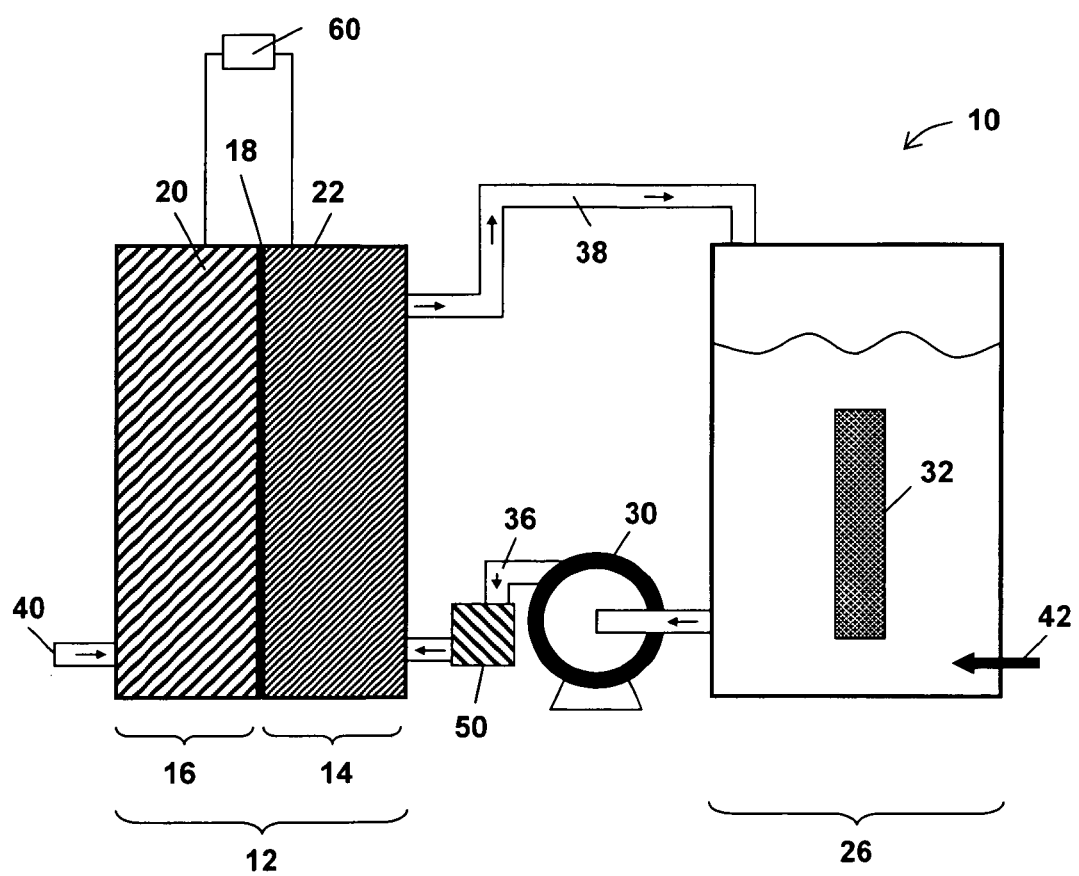
FIG. 1B shows a diagrammatic representation of another embodiment of a bio-fuel cell constructed in accordance with the present invention.

While the microorganisms 36 are shown as being contained in reactor 26, some of the free suspended microorganisms will be distributed throughout the system 10 as the pump 30 circulates solutions. In a preferred embodiment the microorganisms are immobilized on plastic frame structures. However, they can become dislodged due to turbulence in solution due to gas bubbles and the like. As shown in FIG. 1B, one may optionally add a non-aerated vessel 50 (a secondary bioreactor) such that the microorganisms complete their consumption of oxygen before entering cathode compartment 14. Alternatively, the vessel 50 may contain microbial biofilm support such as fibrous or granular bed of inert material on the surface of which microorganisms will form a biofilm. This has the advantage of introducing to the cathodic compartment 14 a liquid having a very low concentration of dissolved oxygen. As a result, little or no microbial growth will be observed inside of the cathodic compartment 14, which would otherwise clog the porous structure of the cathode electrode 22.

Hydrogen gas is supplied to the anode compartment 16 via distribution channels in the bipolar or separation plates or by porous flow distributors and will be well understood by those skilled in the art. Very similar channels or distributors are used to distribute the iron-containing liquid in the cathodic compartment 14.

The hydrogen may also be injected or otherwise introduced directly into compartment 16 using any other method well known to those skilled in the art including by a gas injection manifold. The fuel containing the hydrogen constituent, such as pure hydrogen, may be injected into the anodic compartment 16 via inlet 40, while the oxygen and $CO_2$ are injected or otherwise introduced into bioreactor 26 via inlet 42.

All the liquids which contact microorganisms in the bioreactor 26 preferably contain one or more dissolved nutrient salts to facilitate microbial growth. Preferred nutrient salts include: ammonium sulfate, potassium phosphate, magnesium sulfate, potassium chloride, calcium nitrate, calcium chloride, and sulfuric acid. A typical composition of these salts is given by Silverman and Lundgren (J. of Bacteriology, v. 77, p. 642 (1959)). Thus, the bioreactor 26 and the cathode compartment 14 contain dissolved nutrients for facilitating growth of the chemolithoautotrophic microorganisms. These dissolved nutrients may be one or combination of ammonium sulfate, potassium phosphate, magnesium sulfate, potassium chloride, calcium nitrate, calcium chloride and sulfuric acid. More particularly, the nutrients may contain any combination of the following ions: $NH_4^+$, $K^+$, $Ca^{2+}$, $Mg^{2+}$, $SO_4^{2-}$, $Cl^-$, $PO_4^{3-}$, and $NO_3^-$ in addition to other known in the literature. There may be also micro-nutrients such as Cu, Mn, Mo, Ni, Zn salts.

The oxidation reaction of hydrogen at the anode electrode 20:

$$2H_2 = 4H^+ + 4e^- \tag{6}$$

is coupled with the reduction of ferric ions at the cathode electrode 22:

$$4Fe^{3+} + 4e^- = 4Fe^{2+} \tag{7}$$

The protons ($H^+$), formed by reaction (6), cross the proton-conducting electrolyte 18 into the cathode compartment 14. The ferrous ions ($Fe^{2+}$), formed at the cathode electrode 22, together with protons, are pumped to the bioreactor 26, where they are oxidized by microorganisms to ferric ions ($Fe^{3+}$) according to reaction (1), and then returned to the cathode compartment 14 for the next cycle of electricity production. The overall reaction (chemical plus biochemical) taking place in the system 10, can be obtained by summing the reactions 1, 6 and 7 which gives:

$$2H_2 + O_2 = 2H_2O \tag{8}$$

Therefore, the overall reaction in the system 10 is the same as that in a hydrogen-oxygen fuel cell. The microorganisms 32 plus the iron ions simply act as biocatalyst, which greatly increases the rate of the cathodic reaction. The ratio between the amount of energy used for electricity production and the amount of energy used for microbial growth can be easily controlled by varying cultivation conditions such as the ferric-to-ferrous iron concentration ratio in the bioreactor effluent. It is even possible to bring this ratio to infinity by uncoupling the microbial growth from ferrous iron oxidation. In that case no $CO_2$ is consumed and no biomass is produced.

Therefore, under ideal conditions (no energy loses in the electrochemical cell), up to 90% of the Gibbs free energy of reaction (8) can be used for production of electricity while the remaining 10% will be used by microorganisms for $CO_2$ fixation resulting in biomass formation, as well as for cell maintenance. As mentioned above, the current fuel cells working on hydrogen and oxygen and using platinum as catalyst at both electrodes, have around 50% voltage efficiency (calculated on the basis of the lower heating value). The rest is released as heat, which is often difficult to utilize. Using the same fuel and oxidant, the new bio-fuel cell will produce more electricity plus microbial mass.

Since the cathodic reaction (7) on a carbon electrode is much faster than oxygen reduction on a platinum electrode, and since the oxygen reduction rate is the limiting factor in the currently used fuel cells, the system 10 disclosed herein will drastically improve both the economy and environmental effect over conventional fuel cell operation due to the 1) increase in the voltage efficiency; 2) elimination the use of Pt at the cathode; 3) removal of carbon dioxide from atmosphere; and 4) production of potentially highly useful product, and biomass in the form of single-cell protein.

It has already been shown that *A. ferrooxidans* contains 44% protein, 26% lipids, 15% carbohydrates and at least two B-vitamins, see Tributsch, H, *Nature*, 281, 555 (1979). No negative physiological effect of this type of biomass are known, see Tributsch, H, *Nature*, 281, 555 (1979), but obviously, more research in this direction is needed.

Studies to characterize the system 10 were conducted and for these all the potentials are given vs. the standard hydrogen electrode (SHE). The potentials were measured using an Orion pH-mV meter.

EXAMPLE

In studies to demonstrate the efficacy of the present bio-fuel cell, the bioreactor 26 was inoculated with *A. ferrooxidans* (10% v/v) isolated from a copper mine. The culture media was an aqueous solution containing 0.4 M ferrous ions as sulphate and the nutrient salt composition of Silverman and Lundgren having a pH of 1.8. Air with a flow rate of 200 L/h was injected into bioreactor 26.

Figure 2:
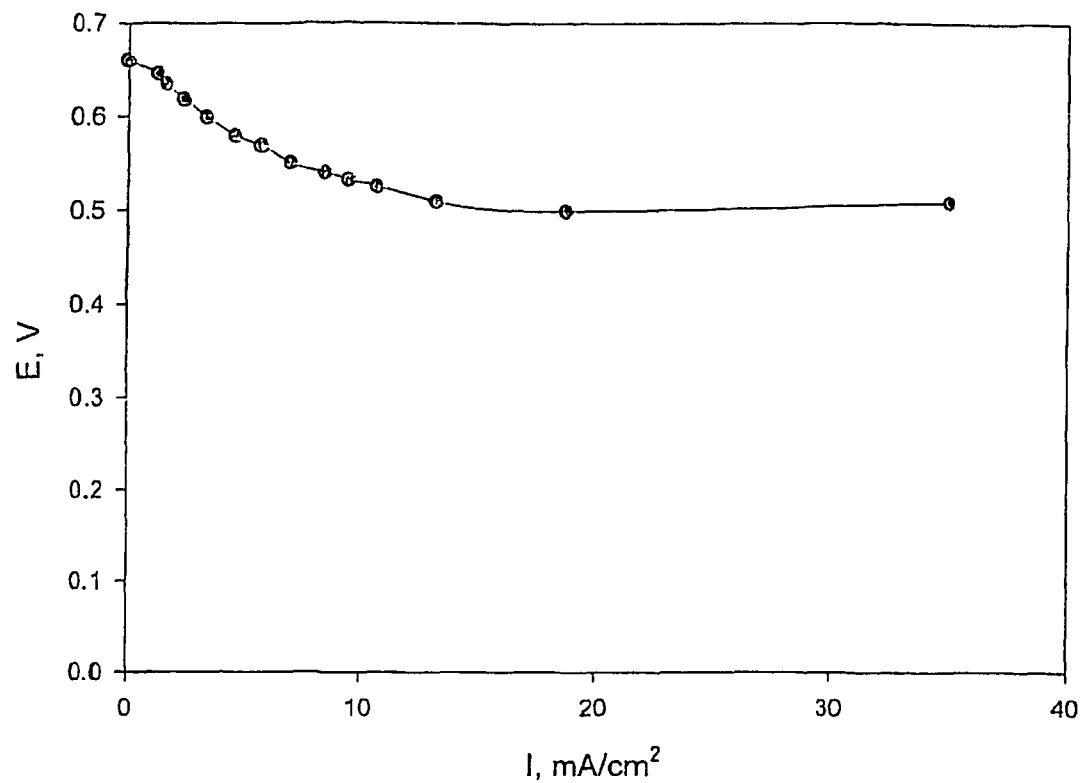
FIG. 2 is a plot of cathode potential versus current density achieved with the fuel cell of FIG. 1A.

After the microbial cells of *A. ferooxidans* were spontaneously immobilizated on the surface of the fibrous support, the oxidation of ferrous ions was observed with a rate of 1.2 g per liter bioreactor volume per hour. Once 99% of ferrous ions in the bioreactor media were oxidized, the latter was circulated with a flow rate of 90 mL/h, using peristaltic pump 30, through the cathodic compartment 14 of the system 10. The anodic compartment 16 was supplied directly with hydrogen at a rate of 0.3 mL/s, also using a peristaltic pump, not shown. T The bioreactor containing immobilized *A. ferrooxidans* was used to oxidize ferrous ions in batch regime. After reaching about 99% conversion of ferrous iron oxidation, the liquid phase was pumped from the bioreactor 26 to the cathode compartment 14. The relationship between the cathode potential and the current density is shown in FIG. 2. The total iron concentration was 0.4 M and pH was 1.8. It can be seen that while there was some drop in the cathode potential, it was 150 mV at a current density of 35 mA/cm$^2$. This potential drop was similar, and in some cases, smaller than that reported in literature on the electrochemical oxygen reduction on platinum.

Figure 3:
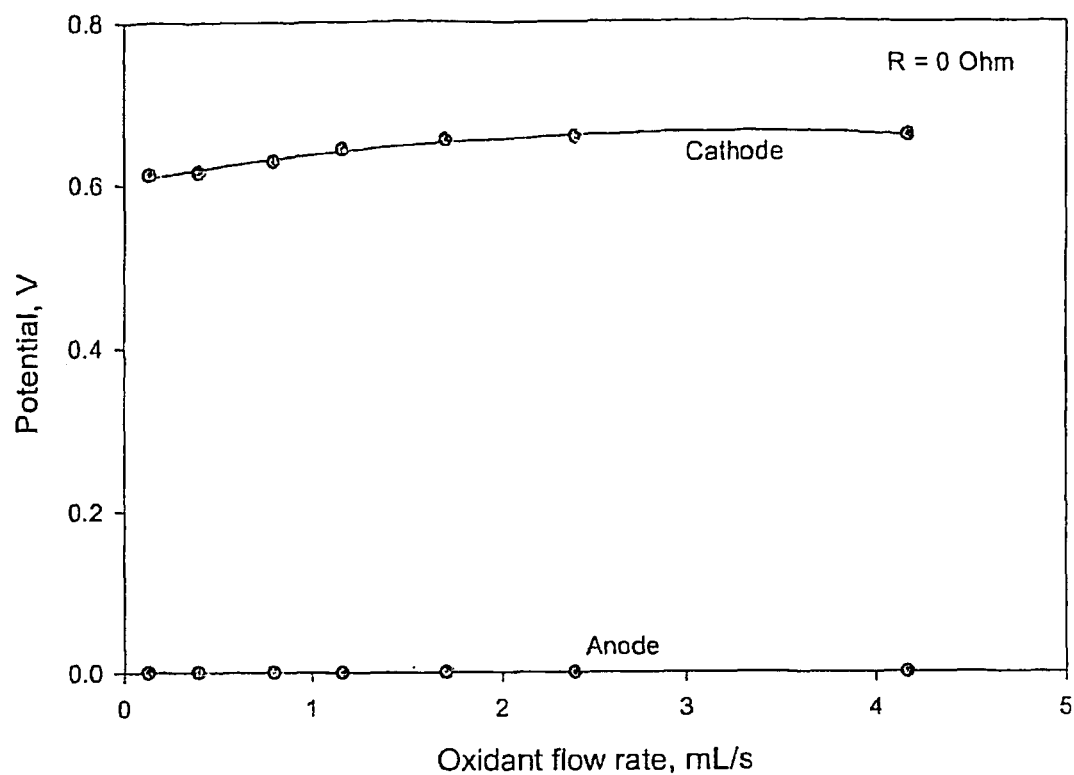
FIG. 3 is a plot of cathode potential versus oxidant flow rate into the cathode compartment of the bio-fuel cell of FIG. 1A.
Figure 4:
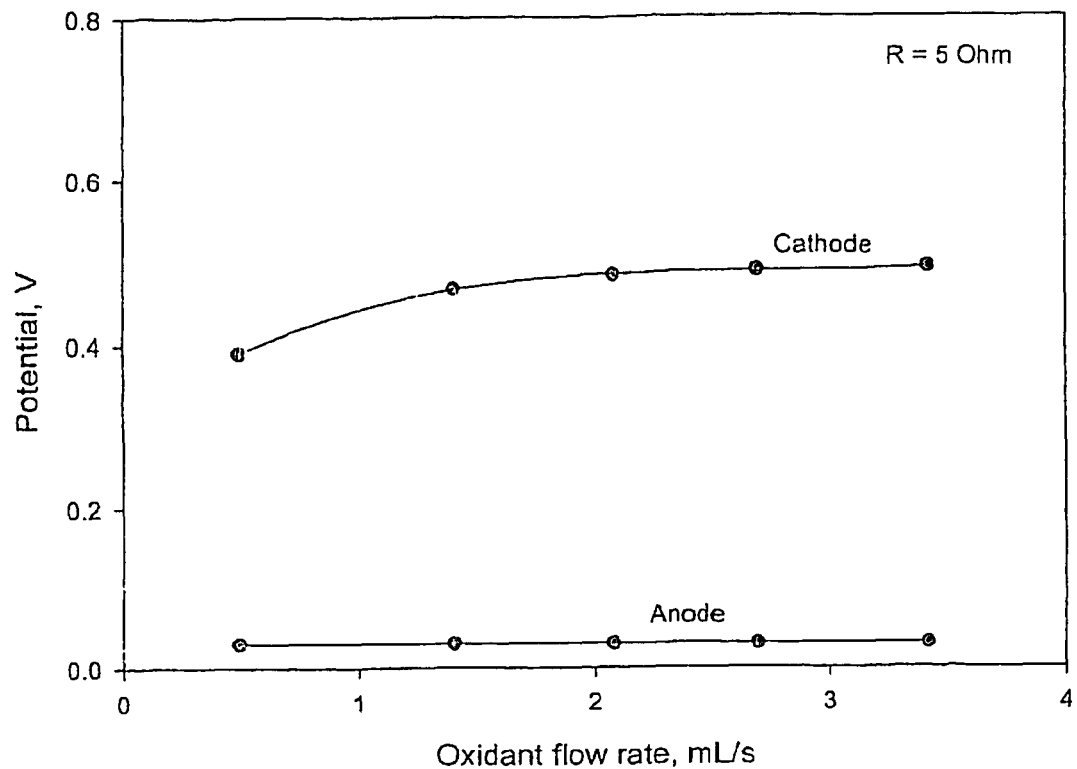
FIG. 4 is a plot of bio-fuel cell potential versus oxidant flow rate into the cathode compartment of the bio-fuel cell of FIG. 1A.

The effect of the flow rate of liquid in the cathode compartment 14 was also studied. The flow rate was varied between 0 and 4.2 mL/s. Two different electrical loads were used: 0 and 5 Ohms. The results with no electrical load (0 Ohm) are shown in FIG. 3. It can be seen that there is only a small increase in the cell potential, from 610 mV to 661 mV, or less than 9%. All of the potential increase was due to the cathode electrode 22, and no effect of the oxidant flow rate on the anode potential was observed (FIG. 3), which was expected. Theoretically, the flow rate should have no effect on the cell potential at zero load. The small variation (9%) observed is most probably due to the cross-current. The effect of the oxidant flow rate on the bio-fuel cell voltage was also studied at a load of 5 Ohms. The results (FIG. 4) show that the effect is more significant than in the case of 0 Ohm load. When the flow rate was increased from 0.5 to 3.4 mL/s, the total cell voltage first increased sharply, and then leveled off. The total increase was 30%. These results show that there are some mass transfer limitations of the oxidant at lower flow rates, below 2 mL/s. At flow rates, higher that this value, no mass transfer limitation was observed.

Figure 5:
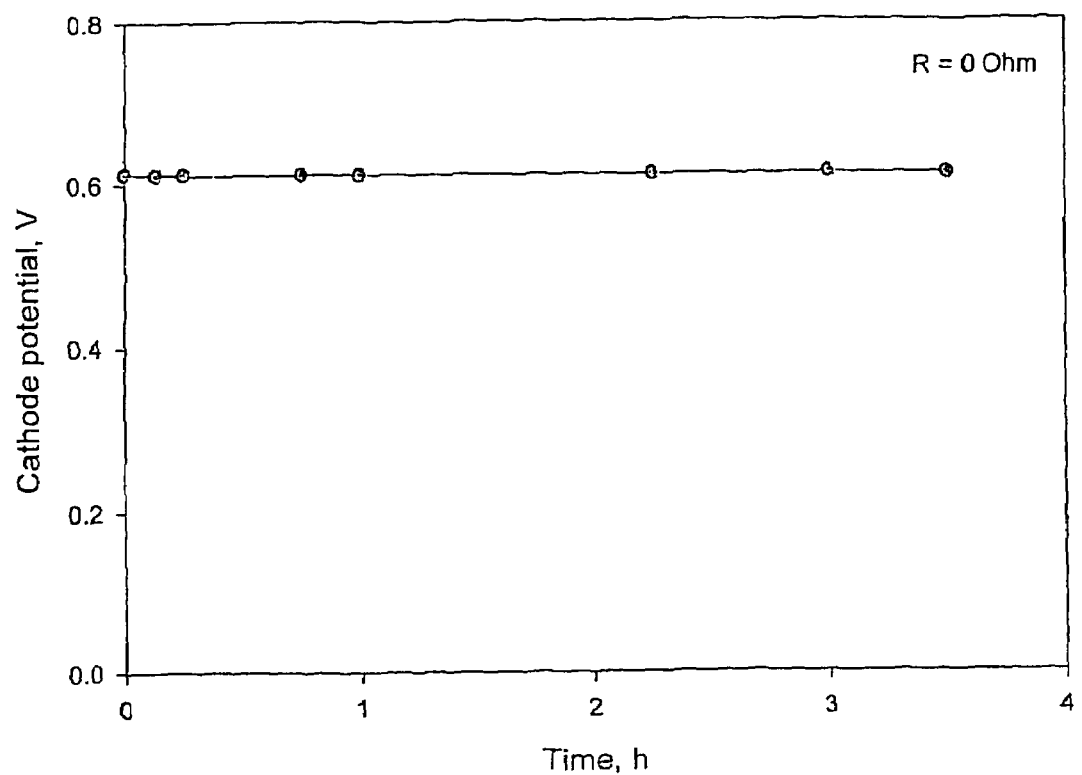
FIG. 5 is a plot of cathode potential versus time for extended operation of the bio-fuel cell of FIG. 1A.

The stability of the bio-fuel cell during several hours of operation was also studied. It was found out (FIG. 5) that the voltage-current characteristics did not change significantly during a period of 3.5 hours.

Advantageously, in addition to producing electricity, the bio-fuel cell system 10, shown in FIG. 1A, is unique in that is capable of transforming $CO_2$ into cellular biomass. Therefore, the bio-fuel cell consumes $CO_2$ from atmosphere during its operation and produces microbial mass, which can be used as single-cell protein (SCP). It has already been shown that *A. ferrooxidans* contains 44% protein, 26% lipids, 15% carbohydrates and at least two B-vitamins, see Tributsch, H, *Nature*, 281, 555 (1979), which makes it potentially an excellent animal feed. No negative physiological effect of this type of biomass are known as discussed by Tributsch. It should be noted that the produced single-cell protein is practically free from both toxic chemicals and pathogens. In the present SCP technologies, toxic chemicals can be found in the case when methanol is used as a substrate, see Ravindra, A. P., *Biotech. Adv.*, 18, 459 (2000). Microbial contamination (which is sometimes toxic) is eliminated in our technology because there are no known pathogenic microorganisms growing on completely inorganic medium containing high concentrations of iron sulfate at a pH between 0.5 and 2. The microbial contamination is a problem in many of the present methods for SCP production as discussed in Ravindra, A. P., *Biotech. Adv.*, 18, 459 (2000).

The system 10 of FIG. 1A requires streams of hydrogen, oxygen and carbon dioxide. As a result of the electrobiochemical reactions, the bio-fuel cell system 10 produces electrical energy, heat, water (as vapour) and microbial cell mass. As mentioned above, the hydrogen is injected into the anodic compartment 16 of the bio-fuel cell via inlet 40, while the oxygen and $CO_2$ injected via inlet 42 are consumed and water and biomass are produced in the bioreactor 26. For industrial ferrous iron oxidation bioreactors, oxygen and carbon dioxide 42 are supplied from the atmosphere.

An embodiment of the system 10 has the following characteristics, calculated on the basis of the mass balance, stoichiometry and kinetics: during the generation of 100 kW of electrical energy: 4 kg/h $H_2$ and 4 kg/h $CO_2$ are consumed; 9 kg/h biomass (SCP) are produced; and 10 m$^3$ bioreactor is preferred. The major advantages of the proposed bio-fuel cell to the currently known types of fuel cells are: high efficiency (80-90% vs. 50% of the lower heating value, respectively); no need for noble-metal cathodes; and the unique feature of the bio-fuel cell is the consumption of carbon dioxide during its operation production of potentially highly useful product, single-cell protein (SCP). By the phrase "lower heating value" is meant that the product water is in a vapour phase.

The energy released by the overall chemical reaction $2H_2 + O_2 = 2H_2O$ is used for the formation of three products: electricity generation, single cell protein (SCP) production, and heat generation. It is possible to operate the bio-fuel cell in such a manner that the ratio between the production of electricity and production of SCP be set at any value between 0 and infinity, i.e. between "production of only biomass and no electricity" and "production of no biomass and only electricity". The ratio of SCP production to electricity production can be controlled by either varying the potential of the cathode, by varying the concentration of nutrient salts, or by varying the cultivation conditions such as the ratio of $Fe^{2+}/Fe^{3+}$ concentrations.

A preferred temperature range in which the bio-fuel cell system 10 disclosed herein operates at is from about 10° C. to about 90° C. For example, the optimal temperature for the bio-fuel cell when using the microorganism *Leptospirillus ferriphilum* is around 40° C.

In a preferred embodiment of the bio-fuel cell system 10 disclosed herein, the pH of the electrolyte is maintained below about 1.0, and preferably at a value in the range from about 0.5 to about 0.9. Maintaining the pH in this range is very advantageous in that at pH values greater than 1 it has been found that significant amounts of insoluble inorganic compounds such as jarosite may be formed in the bioreactor liquid. The formation of jarosite particles leads to the blockage of the porous (fibrous) cathode electrode 22 which negatively impacts the bio-fuel cell performance in the long term. Therefore, it is preferable to use lower pH values below 1.0, preferably between 0.5 and 0.9. In order to function in this acidity range, the microorganisms of the *Leptospirillum* genus and other acid-tolerant iron-oxidizing microorganisms are preferably used, such as *Sulfobacillus* and *Ferroplasma*, since *Thiobacilli* do not tolerate such low pH solutions. While the available literature data suggests that *Leptospirilli* do not oxidize ferrous iron at pH values below 1.0, the inventors have surprisingly discovered that they can oxidize ferrous iron at pH below 1.0 all the way down to pH 0.0.

By operating at such low pH values has very surprisingly reduced buildup and blockage of the cathode electrode 22 to give much longer life to the system 10.

In addition to the iron-oxidizing microorganisms, the bioreactor can contain also a microbial culture able to convert the organic by-products of the iron biooxidation into carbon dioxide and water. This culture may contain heterotrophic and/or mixotrophic microorganisms which consume organic substances, the goal of this microbial culture being to "clean" the liquid in the bio-fuel cell of the organic by-products to prevent their buildup which would reduce the efficiency of the bio-fuel cell over time.

It will be understood that the bio-fuel cell system of the present invention is not restricted to using gaseous hydrogen fuel but may use other hydrogen containing fuels which can undergo electrochemical oxidation, for example methanol and ethanol to mention just a few. For example, the anodic reaction in the case of methanol fuel is:

$$CH_3OH+H_2O=CO_2+6H^++6e^-$$

The hydrogen ions again cross the membrane, and the rest of the bio-fuel cell system operates the same as in the case of bio-fuel cell using gaseous $H_2$ fuel.

In the case of ethanol as a fuel, the anodic reaction is:

$$C_2H_5OH+3H_2O=2CO_2+12H^++12e^-$$

Thus in alternative embodiments of the bio-fuel cell, the fuel may be a compound having a hydrogen constituent (either the only constituent in the case of hydrogen gas or one of several constituents in the case of a compound) and electrochemical oxidation of the fuel produces protons and electrons as with the oxidation of hydrogen but may include other products as well, and the fuel is pumped into the anode compartment 16 in a fluid which may be in the form of a gas or liquid.

Other microorganisms which work in the same way will be known to those skilled in the art and are contemplated by the inventor to be useful in the present invention.

As used herein, the terms "comprises", "comprising", "including" and "includes" are to be construed as being inclusive and open ended, and not exclusive. Specifically, when used in this specification including claims, the terms "comprises", "comprising", "including" and "includes" and variations thereof mean the specified features, steps or components are included. These terms are not to be interpreted to exclude the presence of other features, steps or components.

The foregoing description of the preferred embodiments of the invention has been presented to illustrate the principles of the invention and not to limit the invention to the particular embodiment illustrated. It is intended that the scope of the invention be defined by all of the embodiments encompassed within the following claims and their equivalents.

Therefore what is claimed is:

1. A system for electrical power generation, comprising:
a cathode compartment containing a cathode electrode;
an anode compartment containing an anode electrode and having at least one inlet for introduction of a fuel having a hydrogen constituent into said anode compartment, said anode compartment being separated from said cathode compartment by a membrane permeable to protons;
an external circuit making an electrical connection between the anode electrode and the cathode electrode;
a bioreactor including at least one inlet for introduction of oxygen ($O_2$) and a carbon source into the bioreactor, the bioreactor containing living microorganisms selected to be viable and active at a pH less than about 1.0 and being capable of oxidizing ferrous ($Fe^{2+}$) ions to ferric ions ($Fe^{3+}$), the bioreactor being in flow communication with the cathode compartment, the bioreactor and the cathode compartment containing an aqueous solution, the aqueous solution having a pH below about 1 and including the ferric ions ($Fe^{3+}$) and ferrous ions ($Fe^{2+}$),
a pump for circulating the aqueous solution between the cathode compartment and the bioreactor, wherein in operation:
   i) the aqueous solution is circulated between the cathode compartment and the bioreactor and the fuel is introduced into said anode compartment and a reaction at the anode electrode is electrochemical oxidation of the hydrogen constituent of the fuel to produce electrons ($e^-$) and protons ($H^+$), wherein said protons ($H^+$) cross the proton exchange membrane into the cathode compartment and said electrons ($e^-$) travel to the external circuit, and simultaneously
   ii) oxygen ($O_2$) and the carbon source are introduced into the bioreactor and the aqueous solution so that in the bioreactor the ferrous ions ($Fe^{2+}$) are aerobically oxidized by the microorganisms to ferric ions ($Fe^{3+}$) at a pH below about 1, and in the cathode compartment the ferric ions ($Fe^{3+}$) are reduced to the ferrous ions ($Fe^{2+}$) by electrons flowing from said external circuit to the cathode electrode;
wherein electric power is obtained by electrons passing through a load in the external circuit.

2. The system of claim 1 wherein the microorganisms are mixotrophic.

3. The system of claim 2 wherein the carbon source includes organic substances, carbon dioxide or both.

4. The system of claim 1 wherein the microorganisms are any one or combination of being freely suspended in the aqueous solution and immobilized on a solid support.

5. The system of claim 1 wherein said microorganism is one of chemolithoautotrophic, mixotrophic, heterotrophic and chemolithoautotrophic, and mixotrophic and chemolithoautotrophic, and wherein the carbon source includes carbon dioxide, organic substances or both.

6. The system of claim 1 wherein a genus of each of said microorganisms is any one of *Leptospirillum, Ferroplasma*, and *Sulfobacillus*.

7. The system of claim 1 wherein a genus of each of said microorganisms is any one of *Acidithiobacillus, Alicyclobacilus, Acidimicrobium*, and *Ferrimicrobium*.

8. The system of claim 1 wherein the membrane permeable to protons is an ion exchange membrane selected from the group consisting of cation exchange membrane, anion exchange membrane, perm-selective ion exchange membrane, and combinations thereof.

9. The system of claim 1 wherein the membrane permeable to protons is made of a substantially inert material having pores extending therethrough which are less than about 100 micrometers in diameter.

10. The system of claim 1 wherein the membrane permeable to protons is made of a substantially inert material having pores extending between about 5 and 50 nanometers.

11. The system of claim 1 wherein the membrane permeable to protons is made of one of polytetrafluoroethylene (PTFE), polyether sulfone, glass fiber, polycarbonate with or without mechanical support mesh.

12. The system of claim 1 wherein the membrane permeable to protons is a hydrogel membrane made of a hydrogel.

13. The system of claim 12 wherein the hydrogel is selected from the group consisting of polyvinyl alcohol, polyhydroxyethylmethacrylate, polyethylene oxide, and combinations thereof which may or may not contain a cross-linking agent.

14. The system of claim 12 wherein the hydrogel membrane is mounted on a mechanical mesh support.

15. The system of claim 13 wherein the hydrogel membrane is formed on a surface of the anode electrode or the cathode electrode, thereby forming a membrane-electrode assembly.

16. The system of claim 13 wherein the hydrogel membrane is a layer contacting one of: the anode electrode, and both the anode electrode and the cathode electrode.

17. The system of claim 13 wherein the hydrogel membrane is bonded on one surface thereof to a surface of the anode electrode and bonded on an opposing surface thereof to a surface of the cathode electrode or to both.

18. The system of claim 1 wherein the membrane permeable to protons has a layered structure, the structure comprising a first hydrogel membrane bonded to a membrane made of a substantially inert material having pores extending therethrough less than about 1000 micrometers in diameter.

19. The system of claim 1 wherein the membrane permeable to protons has a layered structure, each layer bonded to adjacent layers, the structure comprising, in order: (i) a first hydrogel membrane, and (ii) a membrane made of a substantially inert material having pores extending therethrough less than about 1000 micrometers in diameter; the first hydrogel membrane being bonded to one of: the anode electrode and the cathode electrode.

20. The system of claim 1 wherein the membrane permeable to protons has a layered structure, each layer bonded to adjacent layers, the structure comprising, in order: (i) a first hydrogel membrane, (ii) a membrane made of a substantially inert material having pores extending therethrough less than about 1000 micrometers in diameter, and (iii) a second hydrogel membrane.

21. The system of claim 20 wherein the first hydrogel membrane is bonded to the anode electrode, and the second hydrogel membrane being is bonded to the cathode electrode.

22. The system of claim 1 wherein the membrane permeable to protons has a layered structure, the structure comprising: a first substantially inert material having pores extending therethrough less than about 1000 micrometers in diameter, a hydrogel membrane bonded on one surface thereof to a surface of the first substantially inert material, and a second substantially inert material having pores extending therethrough less than about 1000 micrometers in diameter bonded on a surface thereof to an opposing surface of the hydrogel membrane to form a sandwich structure of the two substantially inert materials separated by the hydrogel membrane bonded therebetween.

23. The system of claim 1 wherein the aqueous solution includes dissolved nutrients for facilitating growth of the microorganisms.

24. The system of claim 23, wherein the dissolved nutrients include the ions selected from the group consisting of $NH_4^+$, $K^+$, $Ca^{2+}$, $Mg^{2+}$, $SO_4^{2-}$, $Cl^-$, $PO_4^{3-}$, $NO_3^-$, and combinations thereof.

25. The system of claim 23, wherein the dissolved nutrients include micronutrients selected from the group consisting of Cu, Mn, Mo, Ni, Zn, and combinations thereof.

26. The system of claim 23, wherein the pump is selected from the group consisting of centrifugal pumps, positive-displacement pumps and airlift systems.

27. The system of claim 1 wherein the fuel having a hydrogen constituent is selected from the group consisting of hydrogen gas, methanol, ethanol, and combinations thereof.

28. The system of claim 1 wherein the fuel having a hydrogen constituent is hydrogen gas ($H_2$), and wherein the electrochemical oxidation reaction is oxidation of hydrogen at the anode electrode in a reaction given by $2H_2 = 4H^+ + 4e^-$, so that an overall bio-fuel cell reaction is given by $2H_2 + O_2 = 2H_2O$.

29. The system of claim 1 wherein the cathode electrode includes a layer of a porous or fibrous material selected from the group consisting of carbon and stainless steel.

30. The system of claim 1 wherein the cathode electrode includes a solid plate of a material selected from the group consisting of carbon and stainless steel.

31. The system of claim 1 wherein the cathode electrode includes a catalyst selected from the group consisting of gold, platinum, palladium, lead, and combinations thereof.

32. The system of claim 1 where the anode electrode is porous and is made of a carbon-based material, the anode including a catalyst selected from the group consisting of platinum, ruthenium, palladium, and combinations thereof.

33. The system of claim 1 wherein the anode electrode includes a catalyst selected from the group consisting of tungsten carbide, iron phosphide, cobalt phosphide, cobalt phosphide, and combinations thereof.

34. The system of claim 33 wherein the anode electrode catalyst is mixed with a carbon compound.

35. The system of claim 34 wherein said carbon compound is any one or combination of carbon black, activated carbon powder, activated carbon powder fibers, non-activated carbon powder, and non-activated carbon powder fibers.

36. The system of claim 1 wherein the bioreactor is a vessel in flow communication with the cathode compartment and encloses the microorganisms, wherein the ferrous ions ($Fe^{2+}$) are oxidized by the microorganisms to ferric ions ($Fe^{3+}$) in an aerobic oxidation reaction given by $4Fe^{2+}+4H^++O_2=4Fe^{3+}+2H_2O$; wherein the reaction at the cathode electrode is given by $4Fe^{3+}+4e^-=4Fe^{2+}$.

37. The system of claim 23 wherein said microorganism is one of chemolithoautotrophic, mixotrophic, and mixotrophic and chemolithoautotrophic, and wherein and biomass production and carbon dioxide consumption responsively occurs due to fixation of the carbon dioxide ($CO_2$) by the microorganisms in the presence of the dissolved nutrients and the ferrous ions.

38. The system of claim 37 wherein the carbon dioxide ($CO_2$) is atmospheric carbon dioxide ($CO_2$) so that the system is capable of concurrent production of electrical power and biomass, and consumption of atmospheric carbon dioxide ($CO_2$).

39. The system of claim 38 wherein the biomass is single-cell protein.

40. The system of claim 1 wherein the pH of the aqueous solution is maintained at a value between a pH of about 0 to a pH of about 1.0.

41. The system of claim 1 wherein the microorganisms are *Leptospirillum ferriphilum*, and wherein pH of the aqueous solution is maintained at a value between a pH of about 0.5 to a pH of about 0.9.

42. The system of claim 23 wherein said microorganisms are selected from the group consisting of *Leptospirillum ferriphilum, Leptospirillum ferrooxidans, Leptospirillum ferrodiazotrophum, Leptospirillum thermoferrooxidans*, and combinations thereof.

43. The system of claim 23 wherein said microorganisms are selected from the group consisting of *Ferroplasma acodophilum, Ferroplasma cupricumulans, Ferroplasma acidarmanus*, and combinations thereof.

44. The system of claim 23 wherein said microorganisms are selected from the group consisting of *Sulfobacillus thermotolerans, Sulfobacillus thermosulfidooxidans, Sulfobacillus montserratensis, Sulfobacillus sibiricus*, unclassified strains of *Sulfobacillus* and combinations thereof.

45. The system of claim 23 wherein said microorganisms are *Acidithiobacillus ferrooxidans*.

46. The system of claim 23 wherein said microorganisms are selected from the group consisting of *Alicyclobacillus tolerans, Alicyclobacillus disulfidooxidans*, and combinations thereof.

47. The system of claim 23 wherein said microorganisms are *Acidimicrobium ferrooxidans*.

48. The system of claim 23 wherein said microorganisms are *Ferrimicrobium acidiphilum*.

49. The system of claim 23 including a temperature controller for maintaining a temperature of the aqueous solution at a temperature in a range from about 10° C. to about 90° C.

50. A method for production of electrical power, comprising:
   a) introducing a fuel having a hydrogen constituent into an anode compartment containing an anode electrode with a reaction at the anode electrode being electrochemical oxidation of said hydrogen constituent to produce electrons ($e^-$) and protons ($H^+$), wherein said protons ($H^+$) cross a proton conducting membrane into a cathode compartment containing a cathode electrode and said electrons travel ($e^-$) to an external circuit and electrons from the external circuit flow to the cathode electrode in the cathode compartment, the external circuit being connected to the cathode electrode and the anode electrode;
   b) introducing oxygen ($O_2$) and a carbon source into a bioreactor, the bioreactor containing a plurality of microorganisms viable and active at a pH below about 1, the plurality of microorganisms being selected to be able to oxidize ferrous ions ($Fe^{2+}$) to ferric ions ($Fe^{3+}$); and
   c) circulating an aqueous solution including ferrous ions ($Fe^{2+}$) and ferric ions ($Fe^{3+}$) at a pH below about 1.0 from the cathode compartment to the bioreactor, and from the bioreactor to the cathode compartment, with a reaction at the cathode electrode being reduction of ferric ions ($Fe^{3+}$) to ferrous ions ($Fe^{2+}$) by the electrons ($e^-$) flowing to the cathode electrode from the external circuit, and simultaneously the plurality of microorganisms aerobically oxidizing ferrous ions ($Fe^{2+}$) to ferric ions ($Fe^{3+}$) in the bioreactor at a pH below about 1;
   wherein electrical power is obtained by electrons passing through an electrical load in the external circuit.

51. The method of claim 50 wherein the microorganisms are mixotrophic, chemolithoautotrophic, or mixotrophic and chemolithoautotrophic; and wherein the carbon source includes carbon dioxide.

52. The method of claim 50 wherein a genus of each of said microorganisms is one of: *Leptospirillum, Ferroplasma*, and *Sulfobacillus*.

53. The method of claim 50 wherein a genus of each of said microorganisms is any one of: *Acidithiobacillus, Alicyclobacilus, Acidimicrobium*, and *Ferrimicrobium*.

54. The method of claim 51 further including heterotrophic, mixotrophic, or chemolithoautotrophic and heterotrophic, microorganisms in the aqueous solution for consuming organic by-products produced by the microorganisms.

55. The method of claim 51, wherein the fuel having a hydrogen constituent is selected from the group consisting of hydrogen gas, methanol, ethanol, and combinations thereof.

56. The method of claim 55 wherein the fuel having a hydrogen constituent is hydrogen gas, and wherein the electrochemical oxidation of said hydrogen constituent is oxidation of hydrogen at the anode electrode in a reaction given by $2H_2=4H^++4e^-$, so that an overall bio-fuel cell reaction is given by $2H_2+O_2=2H_2O$.

57. The method of claim 51 wherein the bioreactor and the cathode compartment contain dissolved nutrients for facilitating growth of the microorganisms.

58. The method of claim 57, wherein the dissolved nutrients include ions selected from the group consisting of $NH_4^+$, $K^+$, $Ca^{2+}$, $Mg^{2+}$, $SO_4^{2-}$, $Cl^-$, $PO_4^{3-}$, $NO_3^-$, and combinations thereof.

59. The method of claim 57, wherein the dissolved nutrients include micronutrients selected from the group consisting of Cu, Mn, Mo, Ni, Zn, and combinations thereof.

60. The method of claim 58, further including the step of controlling a ratio of electrical production to biomass production by varying one or more microbial cultivation parameters, the microbial cultivation parameters including: an electrical potential of the cathode electrode, a ratio of $Fe^{2+}$ to $Fe^{3+}$ concentrations, and concentrations of the dissolved nutrients concentrations.

61. The method of claim 58 wherein biomass production and carbon dioxide consumption responsively occurs due to fixation of the carbon dioxide ($CO_2$) by the microorganisms in the presence of the dissolved nutrients and ferrous ions.

62. The method of claim 61 wherein the carbon dioxide ($CO_2$) is atmospheric carbon dioxide so that the electrical power is concurrently produced with biomass and atmospheric carbon dioxide ($CO_2$) is consumed.

63. The method of claim 61 wherein the biomass is single-cell protein.

64. The method of claim 50 wherein the pH of the aqueous solution is maintained at a value between a pH of about 0 to a pH of about 1.0.

65. The method of claim 50 wherein the pH of the aqueous solution is maintained at a value between a pH of about 0.5 to a pH of about 0.9.

66. The method of claim 58 wherein the microorganisms are *Leptospirillum ferriphilum*.

67. The method of claim 50 further including the step of maintaining a temperature of the aqueous solution at a temperature in a range from about 10° C. to about 90° C.

\* \* \* \* \*